(12) United States Patent
Wernersson et al.

(10) Patent No.: US 9,172,860 B2
(45) Date of Patent: Oct. 27, 2015

(54) COMPUTATIONAL CAMERA AND METHOD FOR SETTING MULTIPLE FOCUS PLANES IN A CAPTURED IMAGE

(75) Inventors: Mats Wernersson, Helsingborg (SE); Henrik Heringslack, Lomma (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 27 days.

(21) Appl. No.: 13/555,351

(22) Filed: Jul. 23, 2012

(65) Prior Publication Data

US 2013/0050565 A1 Feb. 28, 2013

Related U.S. Application Data

(60) Provisional application No. 61/526,796, filed on Aug. 24, 2011.

(30) Foreign Application Priority Data

Aug. 26, 2011 (EP) .................................... 11006990

(51) Int. Cl.
*H04N 5/232* (2006.01)

(52) U.S. Cl.
CPC ........ *H04N 5/23212* (2013.01); *G06T 2200/21* (2013.01); *G06T 2207/10052* (2013.01)

(58) Field of Classification Search
CPC ................. G06T 2207/10052; G06T 2200/21; H04N 13/0282; H04N 5/23212
USPC .......... 348/148, 207.99, 333.01–333.05, 335, 348/340, 345–346; 396/268; 386/278
See application file for complete search history.

(56) References Cited

U.S. PATENT DOCUMENTS

| | | | |
|---|---|---|---|
| 2002/0054211 A1* | 5/2002 | Edelson et al. | 348/169 |
| 2007/0222859 A1* | 9/2007 | Chang et al. | 348/148 |
| 2008/0131019 A1* | 6/2008 | Ng | 382/255 |
| 2008/0187305 A1* | 8/2008 | Raskar et al. | 396/268 |
| 2010/0020221 A1* | 1/2010 | Tupman et al. | 348/333.01 |
| 2010/0129048 A1* | 5/2010 | Pitts et al. | 386/52 |
| 2012/0019703 A1* | 1/2012 | Thorn | 348/333.03 |

FOREIGN PATENT DOCUMENTS

WO 2008/003348 A1 1/2008

OTHER PUBLICATIONS

Extended European Search Report and European Search Opinion, corresponding to EP 11 00 6990, date of completion May 16, 2012.
Ren Ng et al: "Light Field Photography with a Hand-held Plenoptic Camera", Internet Citation, Feb. 2005, XP002423384, Retrieved from the Internet.
Kirk L. Kroeker; "Photography's Bright Future"., ACM 2 Penn Plaza, Suite 701—New York U.S.A., Jan. 19, 2009; XP040462624.
Tycho Bomancz: "Lichtfelder and Linsen", Jun. 22, 2011, XP002676072.

* cited by examiner

*Primary Examiner* — Dennis Hogue
(74) *Attorney, Agent, or Firm* — Renner, Otto, Boisselle & Sklar, LLP

(57) ABSTRACT

Camera devices in form of a computational camera and corresponding methods are described wherein at least two different focus planes are set in an image.

13 Claims, 3 Drawing Sheets

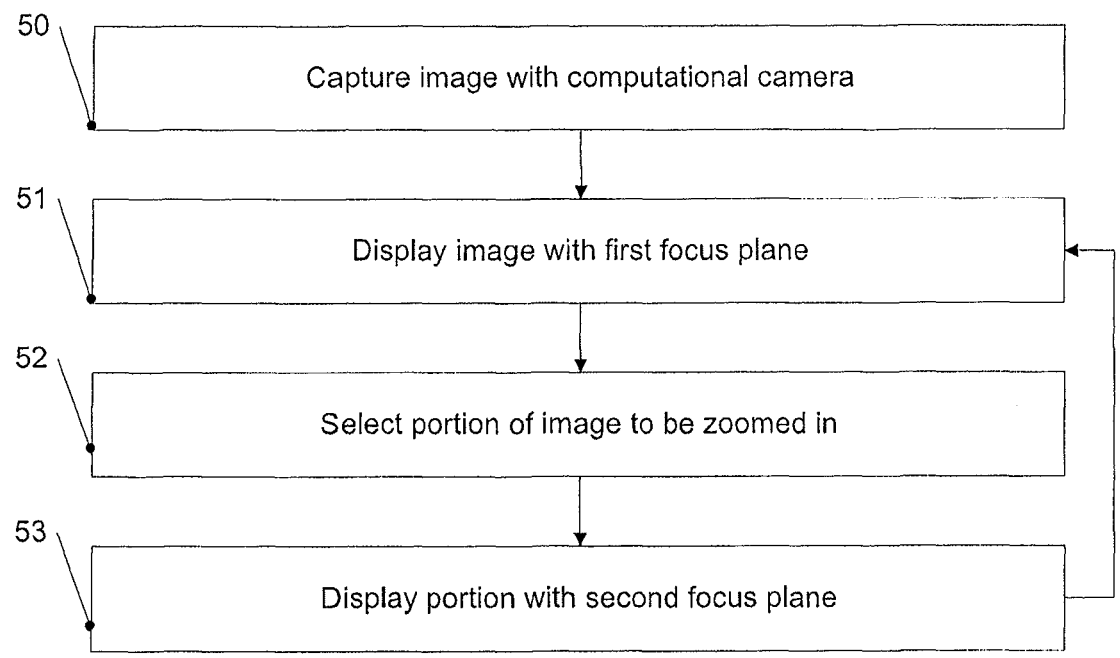
Fig. 5
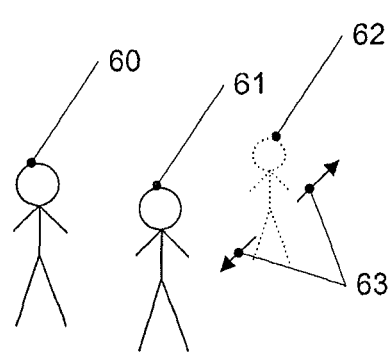 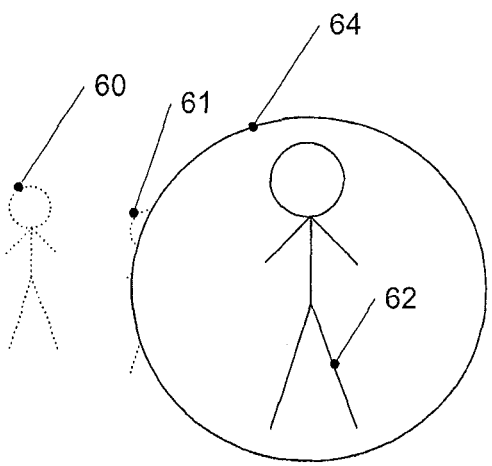
Fig. 6A                Fig. 6B

COMPUTATIONAL CAMERA AND METHOD FOR SETTING MULTIPLE FOCUS PLANES IN A CAPTURED IMAGE

FIELD OF THE INVENTION

The present invention relates to focusing, i.e., setting one or more focused areas and/or setting one or more focus planes, in images captured by cameras and to corresponding devices.

BACKGROUND OF THE INVENTION

In conventional cameras, an image of a scene to be captured is reproduced on an image sensor, for example a CCD sensor a CMOS sensor, via a lens. The lens may be a so called fixed focus lens where a focus plane has a fixed distance from the lens or may be a variable focus lens where the position of the focus plane may be varied. Objects in or adjacent to the focus plane appear "sharp" in the image captured by the image sensor, while objects outside or farther away from the focus plane appear more or less blurred. Depending on an aperture used, an area where objects appear sharp in the captured image may extend to some distance on both sides of the focus plane. In such a conventional camera, the position of the focus plane and the sharpness of the recorded image may only be influenced by post processing in a very limited manner. It should be noted that depending on the lens used, the focus plane need not be an actual plane, but may also be curved.

A new type of camera which has been developed and researched in recent years is the so called computational camera. In computational cameras, the image is not directly reproduced on the image sensor, such that essentially, apart of operations like demosaicing and sharpening, the output of the image sensor directly shows the captured scene, but light rays from the scene in computational cameras are guided to an image sensor in an unconventional manner. For example, light rays originating from a single object in the scene to be captured may be guided to different locations remote from each other on an image sensor, which corresponds to viewing the object from different directions. To this end, for example a conical mirror may be arranged in front of a lens. In other implementations, an optic used for guiding light from a scene to be recorded to the image sensor may be variable, for example by varying geometric or radiometric properties. Such a variable optic may for example comprise a two-dimensional array of micro mirrors which have controllable orientations.

Unlike conventional cameras, in computational cameras a more sophisticated processing of the data captured by the image sensor is necessary to provide the final image. On the other hand, in many cases there is a higher flexibility in setting parameters like focus plane of the final image.

It is an object of the present invention to exploit the possibilities such computational cameras offer.

SUMMARY

The invention provides a method of capturing an image with a computational camera and processing the image, and a computational camera device.

According to an embodiment, the method comprises:
capturing an image with a computational camera, and
setting at least two different focus planes in the image.

According to an embodiment, the method may comprise setting objects between the at least two different focus planes to be out of focus.

According to an embodiment, setting at least two different focus planes may comprise identifying at least two different objects in the image, the at least two different objects having different distances to the computational camera when the image is captured, and setting the at least two different focus planes to comprise the at least two identified objects.

According to an embodiment, the method may further comprise displaying the image with the at least two different focus planes.

According to an embodiment, the at least two different focus planes may comprise at least one first focus plane and at least one second focus plane, and the method may further comprise:
  displaying the image with a focus in the at least one first focus plane,
  magnifying a portion of the image,
  selecting the at least one second focus plane to comprise an object shown in the magnified portion of the image, and
  displaying the magnified portion with a focus in the at least one second focus plane.

According to an embodiment, the method may further comprise reverting to displaying the image with a focus in the at least one first focus plane after displaying the magnified portion.

According to an embodiment, the method may further comprise selecting the portion of the image to be magnified by a gesture on a touch screen of the computational camera.

According to an embodiment, the gesture may be selected from the group consisting of a tap, a double tap, a drawing of a circle and a moving of two fingers in opposite directions.

According to an embodiment, at least one focus plane of the at least two different focus planes may cover only a part of an area of the image.

According to a further embodiment, the computational camera device comprises:
  an image sensor,
  optics to guide light from a scene to said image sensor, and
  a processing unit configured to process data from the image sensor to form an image, wherein the processing unit is configured to set at least two different focus planes in the image.

According to an embodiment, the device may be implemented as a mobile device selected from the group consisting of a dedicated camera device, a mobile phone, a smartphone, a personal digital assistant and a computer.

According to an embodiment, the device may further comprise an input device to enable a user to select a portion to be magnified in the image, wherein the processing unit is configured to set at least one of the at least two different focus planes to comprise an object in the selected portion of the image.

According to an embodiment, the device may be configured to perform anyone of the above-described methods.

With the above-described embodiments higher flexibility in focusing can be obtained. In some cases, objects have different distances to the cameras when recording the image can be put in focus, with intermediate objects being out of focus. In other embodiments, zoomed in areas may be viewed sharply.

BRIEF DESCRIPTION OF THE DRAWINGS

Further embodiments of the invention will be described below with reference to the attached drawings wherein:

FIG. 5 is a flowchart illustrating a further embodiment of a method according to the invention; and FIGS. 6A and 6B are diagrams illustrating the embodiment of FIG. 5.

In the following, various embodiments of the present invention will be described in detail. It should be noted that features of different embodiments may be combined with each other unless noted otherwise. On the other hand, describing an embodiment with a plurality of features is not to be construed as indicating that all those features are necessary for practicing the invention, as other embodiments may comprise less features and/or alternative features. Generally, the embodiments described herein are not to be construed as limiting the scope of the present application.

Figure 1:
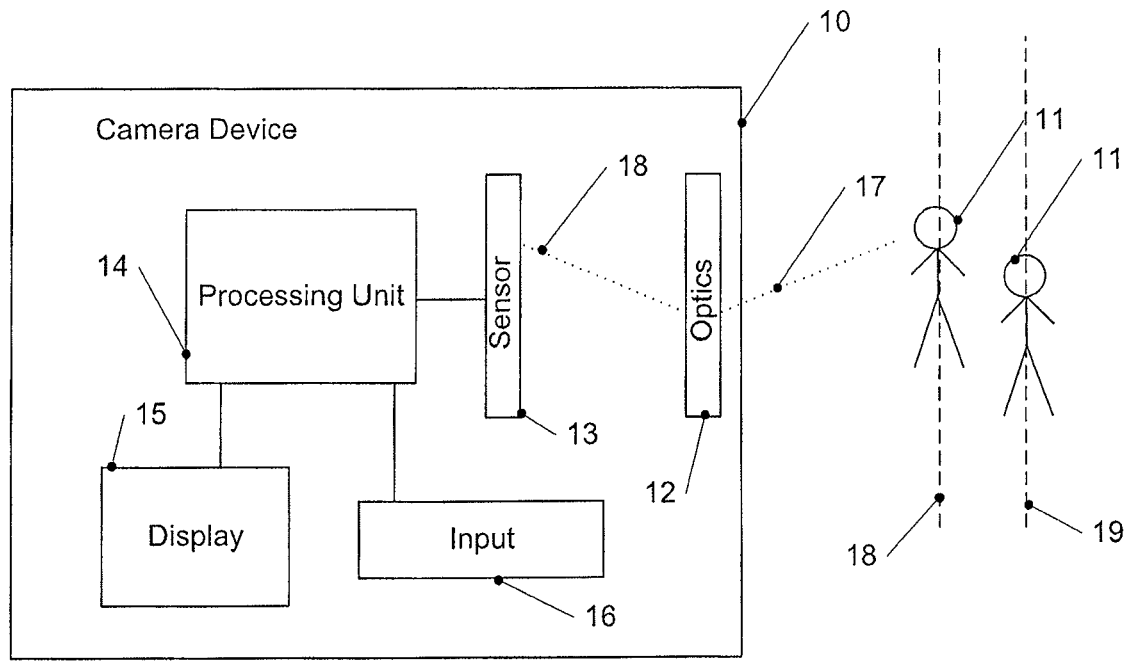
FIG. 1 is a block diagram illustrating an embodiment of the invention.

In FIG. 1, a camera device 10 according to an embodiment is shown. Camera device 10 may be a dedicated camera, but may also be any other device incorporating a camera, for example a mobile phone or smartphone incorporating a camera, a personal digital assistant (PDA) incorporating a camera or a computer like a laptop computer or a tablet PC incorporating a camera. In FIG. 1, only those components relating to camera operation according to embodiments are shown. Other components, for example components for providing mobile telephony capabilities in case camera device 10 is a mobile phone, may also be present and be implemented in any conventional manner.

Camera device 10 is configured as a computational camera device. To this end, camera device 10 comprises optics 12 for guiding light rays like a light ray 17 from a scene to be captured, in the example two persons 11, to a sensor 13. Optics 12 do not reproduce the image directly on the sensor, but as explained in the introductory portion, guide the light rays from the scene to be taken to sensor 13 in an "unconventional" manner. For example, light ray 17 may be guided to sensor 13 as light ray 18.

To this end, besides one or more lenses or optics 12 may comprise other elements like a conical mirror or a micro mirror arraignment with controllable mirrors. Other types of light modulators or mirrors may as well be included in optics 12.

Sensor 13 may be any conventional image sensor like a CCD sensor, a CMOS sensor or a CCD sensor. For recording of color images, sensor 13 may have a color filter in front of the sensor, for example a color filter using the so called Bayer pattern, as conventionally used in digital cameras. In other embodiments, sensor 13 may comprise different layers for recording different colors. In still other embodiments, sensor 13 may be configured to record monochrome images.

An output of sensor 13 is supplied to processing unit 14 for processing the signals from the sensor to generate an image of the recorded scene, which then may be displayed on display 15, which for example may be a LCD or LED screen of camera device 10. Furthermore, camera device 10 comprises an input 16 to allow a user to control camera device 10. Input device 16 may for example comprise buttons, joysticks or a keypad. In some embodiments, display 15 may be a touch-screen, and in this case input device 16 may also comprise display 15 to enable inputs via gestures on the touch screen provided as display 15.

As will be explained in the following, processing unit 14, in some cases based on inputs received from input device 16, may set one or more focus planes in the image, i.e. objects in certain planes in the image appear sharp to a viewer, while other objects appear for example blurred. For example, in the example scene shown in FIG. 1 persons 11 may both be in a respective focus plane 18 or 19, respectively, while other items (not shown) for example between persons 11 appear blurred. It should be noted that persons 11 only form a simple example for a scene, and a scene may comprise any kind of objects like persons, animals, trees, houses, mountains or other scenery.

Figure 2:
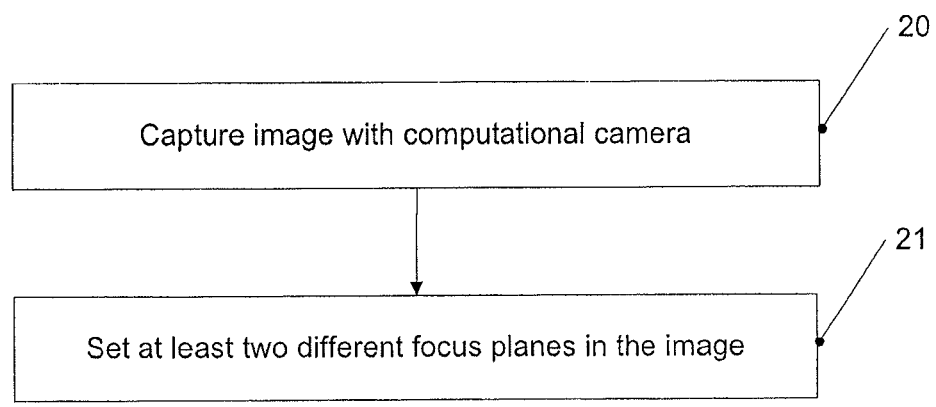
FIG. 2 is a flowchart illustrating an embodiment of a method according to the invention.

In FIG. 2, a flowchart illustrating a method according to an embodiment is shown. The method of FIG. 2 may for example be implemented in camera device 10 of FIG. 1, but may also be implemented independently therefrom.

At 20, an image is captured with a computational camera, for example camera device 10 of FIG. 1. At 21, at least two different focus planes in the image are set. It should be noted that the at least two different focus planes may be set in the image simultaneously, such that an image computed by the computational camera, for example by processing unit 14 of FIG. 1, comprises at least two different focus planes, and/or the at least two different focus planes may be set alternatively, such that, for example based on a user action, the image is recalculated and the focus changed. It should further be noted that a focus plane may also be set only in part of the image, such that objects in the focus plane in the corresponding part of the image appear sharp, whereas objects in the same plane, but outside the part of the image, but appear for example blurred.

Next, with reference to FIG. 3, an embodiment of a method will be discussed where the at least two different focus planes are set simultaneously in the image. The method of FIG. 3 may be implemented in camera device 10 of FIG. 1, but may also be implemented independently therefrom.

At 30, an image is captured with a computational camera, for example camera device 10 of FIG. 1. At 31, at least two different objects at different distances from the camera are identified, for example at least two persons or at least two faces. This identification may be performed automatically for example by using face recognition technique. In other embodiments, based on the captured image, a preliminary image may be displayed, and a user may select the at least two objects.

At 32, at least two different focus planes are set comprising the at least two objects identified at 31. For example, in case of two identified objects a first focus plane may be set comprising a first one of the objects and a second focus plane may be set comprising a second one of the object. Of course, e.g. in case more than two objects are identified, also more than two focus planes may be used. At 33, the image is displayed with the two different focus planes, i.e. the corresponding calculations are performed for example by processing unit 14 of FIG. 1.

Figure 3:
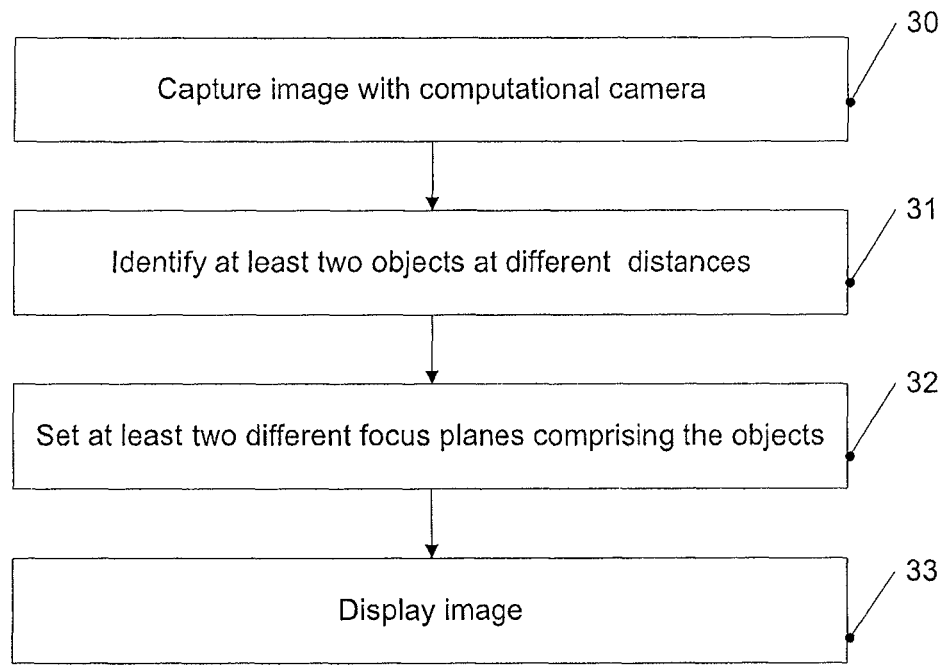
FIG. 3 is a flowchart illustrating a further embodiment of a method according to the invention.
Figure 4:
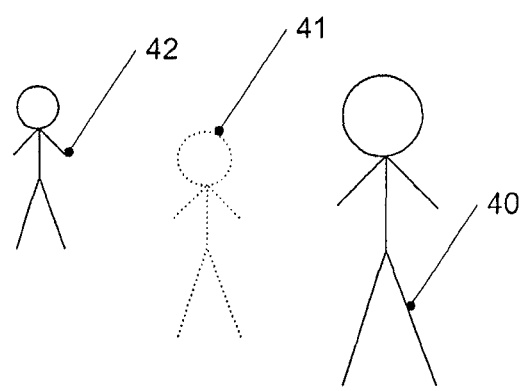
FIG. 4 is a diagram for illustrating the embodiment of FIG. 3.

To further illustrate the method of FIG. 3, in FIG. 4 a simple example of an image showing three persons 40, 41 and 42 is shown. In the example, in reality all three persons 40, 41 and 42 have the same size. However, person 40 is closest to the camera device and therefore appears largest, person 41 is farther away than person 40 and person 42 in turn is farther away than person 41 and therefore appears smallest. In the example shown, persons 40 and 42 have been identified as objects of interest, and focus planes have been set accordingly such that persons 40 and 42 appear sharp, i.e. focused. On the other hand, no focus plane has been set corresponding to the position of person 41, such that person 41 appears blurred, represented by a dashed line in FIG. 4.

In FIG. 5, a method according to a further embodiment is illustrated. The method of FIG. 5 is an example where two focus planes are set alternatively, i.e. one after the other. The method of FIG. 5 may be implemented in the camera device 10 of FIG. 1, but may also be implemented independently therefrom.

At 50, an image is captured with a computational camera like camera device 10 of FIG. 1. At 51, the image is displayed with a first focus plane. This essentially corresponds to a conventional display of an image. At 52, a portion of the image to be zoomed in, i.e. to be magnified, is selected. At 53, the selected portion is displayed with a second focus plane, in particular a focus plane comprising an object in the selected portion. In this way, the selected portion or at least an object in the selected portion appears sharp, i.e. focused.

In FIG. 5, after displaying the portion with the second focus plane at 53, for example based on a user input the zooming may be quit and the method may revert to displaying the image with first focus plane at 51. However, this reverting to 51 is purely optional.

The method of FIG. 5 will now be illustrated using an example shown in FIGS. 6A and 6B.

In FIG. 6A, an example for an image with a first focus plane mentioned with respect to 51 of FIG. 5 is shown. The image shown as an example comprises three persons 60, 61 and 62, which in reality have the same size. Persons 60 and 61 are in the same distance from the camera, while person 62 is farther away. In the example of FIG. 6A, persons 60 and 61 are in a focus plane and therefore appear sharp, while person 62 is out of focus and therefore appears blurred, again represented by dashed lines.

In the example of FIG. 6A, a user now selects a portion around person 62 for zooming. When the image is displayed on a touch screen, this may for example be done with a predetermined gesture. For example, a person may move two fingers on the screen as indicated by arrows 63, i.e. move the fingers apart from each other over the area to be zoomed. Other possible gestures include drawing a circle around the area to be zoomed in or tapping the area to be zoomed in, for example with a double tap.

In response to the gesture, as shown in FIG. 6, the person 62 is zoomed in, i.e. magnified. In the example of FIG. 6B, this is symbolized by a circle 64 being drawn around the zoomed area. In other embodiments, other markers for indicating the zoomed area or no markers may be used. In still other embodiments, the zoomed area may be displayed on the complete screen or other display available. In the example of FIG. 6B, in response to the zooming operation now the focus plane has been moved to include person 62 such that zoom person 62 appears sharp and in focus, whereas persons 60 and 61 are now out of focus and appear blurred. It should be noted that in other embodiments the focus plane for person 62 may be additionally incorporated such that persons 60 and 61 continue to be focused.

It should be noted that the embodiments of FIGS. 3 and 5 may be combined with each other. In particular, at 51, an image may also be displayed with two or more different focus planes, and when zooming if further focus plane may be introduced. For example, starting with the image shown in FIG. 4, person 41 may be zoomed in and a focus plane may be introduced such that person 41 appears focused. As a matter of course, the images shown in FIGS. 4, 6A and 6B are to be regarded only as simple examples for illustrating the invention, and embodiments of the invention may be applied to any kind of images.

The invention claimed is:

1. A method of capturing and processing an image of a scene, comprising:
    capturing the image of the scene with a computational camera;
    setting at least two different focus planes in the captured image, the at least two different focus planes comprising at least one first focus plane and at least one second focus plane, at least one first object in the scene being located at the at least one first focus plane and at least one second object in the scene being located at the at least one second focus plane;
    displaying a first rendered image of the captured image with a focus in the at least one first focus plane, the at least one first object being in focus and the at least one second object being out of focus in the first rendered image;
    selecting a portion of the first rendered image having the at least one second object by a user input command;
    displaying a second rendered image of the captured image having a first region with the at least one first object, and a second region with a focus in the at least one second focus plane in which the at least one second object is in focus and displayed at a larger size compared to a size at which the at least one second object is displayed in the first rendered image, and
    wherein the second rendered image has a first region with a focus in the at least one first focus plane in which the at least one first object is in focus.

2. The method of claim 1, further comprises setting objects between the at least two different focus planes to be out of focus.

3. The method of claim 1, wherein setting at least two different focus planes comprises:
    identifying at least two different objects in the captured computational image, the at least two different objects corresponding to respective objects in the scene, the respective objects having different distances to the computational camera when the image is captured, and
    setting the at least two different focus planes to comprise the at least two identified objects.

4. The method of claim 1, further comprising displaying the captured image with the at least two different focus planes.

5. The method of claim 1, further comprising reverting to displaying the first rendered image of the captured computational image with a focus in the at least one first focus plane after displaying the second rendered image.

6. The method of claim 1, further comprises selecting the portion of the first rendered image to be magnified by a gesture on a touch screen of the computational camera.

7. The method of claim 6, wherein the gesture is selected from the group consisting of a tap, a double tap, a drawing of a circle and a moving of two fingers in opposite directions.

8. The method of claim 1, wherein at least one focus plane of the at least two different focus planes covers only a part of an area of the image.

9. A computational camera device, comprising:
    an image sensor,
    optics to guide light from a scene to said image sensor, and
    a processor configured to process data from the image sensor to form a captured image, wherein the processor is configured to set at least two different focus planes in the captured image, the at least two different focus planes comprise at least one first focus plane and at least one second focus plane, and at least one first object in the scene being located at the at least one first focus plane and at least one second object in the scene being located at the at least one second focus plane;

wherein, the processor is configured to successively display a first rendered image of the captured image with a focus in the at least one first focus plane, the at least one first object being in focus and the at least one second object being out of focus in the first rendered image, select a portion of the first rendered image having the at least one second object by a user input command, and display a second rendered image of the captured image having a first region with the at least one first object, and a second region with a focus in the at least one second focus plane in which the at least one second object is in focus and displayed at a larger size compared to a size at which the at least one second object is displayed in the first rendered image, and wherein the second rendered image has a first region with a focus in the at least one first focus plane in which the at least one first object is in focus.

10. The computational camera device of claim 9, wherein the device is implemented as a mobile device selected from the group consisting of a dedicated camera device, a mobile phone, a smartphone, a personal digital assistant and a computer.

11. The device of claim 9 further comprising an input device to enable a user to select a portion to be magnified in the first rendered image of the computational image, wherein the processor is configured to set at least one of the at least two different focus planes to comprise an object in the selected portion of the image.

12. The device of claim 9 further comprising wherein, the processor is configured to revert to displaying the first rendered image of the computational image with a focus in the at least one first focus plane.

13. A computational camera device, comprising:
an image sensor,
optics to guide light from a scene to said image sensor, and
a processor configured to process data from the image sensor to form a computational image, wherein the processor is configured to set at least two different focus planes in the image,
wherein the device is configured to perform the method of claim 1.

* * * * *